United States Patent

Ovshinsky

[15] 3,654,864

[45] Apr. 11, 1972

[54] PRINTING EMPLOYING MATERIALS WITH VARIABLE VOLUME

[72] Inventor: Stanford R. Ovshinsky, Bloomfield Hills, Mich.

[73] Assignee: Energy Conversion Devices, Inc., Troy, Mich.

[22] Filed: Jan. 16, 1970

[21] Appl. No.: 3,453

[52] U.S. Cl. ..................101/426, 101/1, 101/170, 346/76 L

[51] Int. Cl. ..................B41n 1/00

[58] Field of Search ..................340/173 LS; 346/76 L; 101/DIG. 5, 426, 170, 1

[56] References Cited

UNITED STATES PATENTS

| | | | |
|---|---|---|---|
| 3,112,693 | 12/1963 | Williams | 101/DIG. 13 |
| 3,475,760 | 10/1969 | Carlson | 346/1 |
| 3,271,591 | 9/1966 | Ovshinsky | 307/258 |
| 3,340,405 | 9/1967 | Ovshinsky | 307/258 |
| 3,530,441 | 9/1970 | Ovshinsky | 340/173 |
| 3,506,779 | 4/1970 | Brown et al. | 178/6.6 |

OTHER PUBLICATIONS

IBM Technical Disclosure Bulletin, vol. 10, No. 6, November 1967, page 760, article by Holmstrom et al. " Deformation Recording Meth."

*Primary Examiner*—Edgar S. Burr
*Attorney*—Edward G. Fiorito

[57] ABSTRACT

A printing drum is coated with a glassy material which is switched between an amorphous state and a crystalline state by the application of a laser beam. The coating occupies less volume in the crystalline state than in the amorphous state. In one mode of operation the coating is initially in the amorphous condition and is selectively switched into the crystalline condition at discrete locations by writing thereon with a laser beam. The crystalline areas form depressions which are filled with ink. A doctor blade cleans the surface of the coating leaving ink in the depressions for printing. In another mode of operation the coating is initially in a crystalline or more ordered condition and the laser beam switches it to an amorphous or disordered condition thereby raising the surface of the coating at the points where the laser beam strikes the coating. A pressure sensitive paper is rolled against the coating and an image appears on the paper corresponding to the pattern of peaks formed on the coating. The depressions and peaks on the coating are erased by reapplication of the laser at a different energy level.

6 Claims, 6 Drawing Figures

INVENTOR.
STANFORD R. OVSHINSKY
BY Edward G. Fiorito
ATTORNEY

INVENTOR.
STANFORD R. OVSHINSKY
BY Edward G. Fiorito
ATTORNEY

PRINTING EMPLOYING MATERIALS WITH VARIABLE VOLUME

The present invention is usable in the printing field for producing multiple copies or single copies. The printing can be accomplished by either the intaglio method of printing, or the relief method or printing. In the intaglio method of printing, depressed areas are formed in the printing plate and the whole plate is flooded with ink and wiped clean again. Although the surface of the plate is clean, ink remains in the depressed areas and will print when paper is pressed against it. Typical examples of this method of printing are gravure, rotogravure and engraving. Each of these printing processes normally employ photomechanical reproduction techniques requiring coatings to sensitize the surface of the printing plate, solutions to etch the surface of the plate, and various other chemicals to wash and prepare the printing plate during stages of its formation. Similarly relief printing, also called letterpress printing, normally employs photomechanical reproduction processes wherein the negative of the image is etched into the surface of the printing plate leaving a raised image which is inked and pressed into the paper.

Since these printing processes require the removal of material during the etching process, it is not reversible and accordingly the plates are normally not used again to print a different image. Also, these printing processes are not adaptable for on-line use with computers due to the slow etching speed and various other chemical reactions which are necessary in these processes. Another disadvantage associated with these printing processes is the difficulty encountered in proofreading and making corrections on the plates.

A principle object of the present invention is to provide a new and improved method and apparatus for producing an image on a printing plate which can be used for either relief or intaglio printing. The surface of a printing plate is composed of a glassy material capable of being switched between an amorphous or generally disordered state to a crystalline or more ordered state by the application of energy thereto. Typical examples of materials which exhibit this property are known as amorphous semiconductor materials, and may be found, for example, in U.S. Pat. No. 3,271,591 granted on Sept. 6, 1966 to Stanford R. Ovshinsky. Other materials which exhibit a change in volume in response to the application of energy thereto may be employed. Further, the electrical properties of the amorphous semiconductors may change during the operation of the present invention but this change need not be utilized.

In accordance with the present invention a source of energy such as a laser or electron beam is directed against the glassy surface in accordance with a desired pattern or image to be printed. In one mode of operation the glassy surface may be in the amorphous state occupying a relatively large volume. The beam of energy impinging on the surface causes discrete areas to be switched into the crystalline or more ordered state in which the material occupies less volume. Accordingly, depressions appear in the glassy surface at those locations where the beam impinges.

The entire surface may be flooded with ink and then wiped clean with a doctor blade leaving ink residing only in the depressions. Upon pressing the glassy surface against a document, ink is transferred from the depressions to the paper, thereby printing the image written by the beam of energy. Multiple copies can be run from the surface using the normal intaglio method of printing.

In another mode of operation of the present invention the glassy surface is initially placed in a crystalline or more ordered state in which it occupies a relatively smaller volume. The beam of energy switches the glassy material from the more ordered state to the amorphous or disordered state wherein the material occupies greater volume. Accordingly, raised discontinuities appear on the surface of the glassy material at the locations where the beam impinges. A relief of the image is formed on the surface which may be inked and copies printed therefrom, or the raised discontinuities may be pressed into a pressure sensitive paper such as a sandwich of ordinary paper and carbon paper, or various forms of carbonless papers.

The laser or electron beam may be controlled in response to data supplied directly from a computer, or read from a magnetic tape or disc prepared by a computer. Since the discontinuities are formed immediately in the glassy surface and printing follows directly, the present invention may be employed as the output printer for a computer. For this application the glassy material may be coated on the surface of a revolving drum. A single copy may be produced during one revolution of the drum or multiple copies may be run off during a plurality of revolutions of the drum. Prior to supplying a second image to the drum the discontinuities formed on the drum in response to the first pattern of energy may be erased in accordance with the present invention. This may be accomplished by applying energy to the glassy material to switch it back to its original amorphous state in the case of the intaglio method of printing, or switch it back to its crystalline or more ordered state in the case of the relief method of printing. The energy may be applied broadly across the entire surface of the glassy substance with, for example, a quartz heat lamp, or may be applied to selected discrete points on the surface by the application of the laser or electron beam. The intensity and time interval of the beam determines the particular state into which the glassy material is switched.

The reversible feature of the present invention allows the same printing plate to be used a large number of times in many different applications, including computer output printers. Still another advantage of this feature is the ability to make corrections after visually observing the image written on the glassy surface. The discontinuities may be observed visually and any unwanted portions may be erased prior to running copies.

Still another advantage of the present invention is the ability to print varying shades of gray. This may be accomplished by varying the energy content in the laser or electron beam producing depressions or raised discontinuities of varying height, depth and breadth. This feature of the invention also permits accommodations to be made for paper of varying hardness and thickness.

From the above description it can be seen that the present invention does not require the use of chemical etchants or wash solutions, and avoids the time required to perform process steps employing these chemicals.

Other objects, advantages and features of this invention will become apparent to those skilled in the art upon reference to the accompanying specification, claims and drawings in which:

Figures 1, 2, 3:
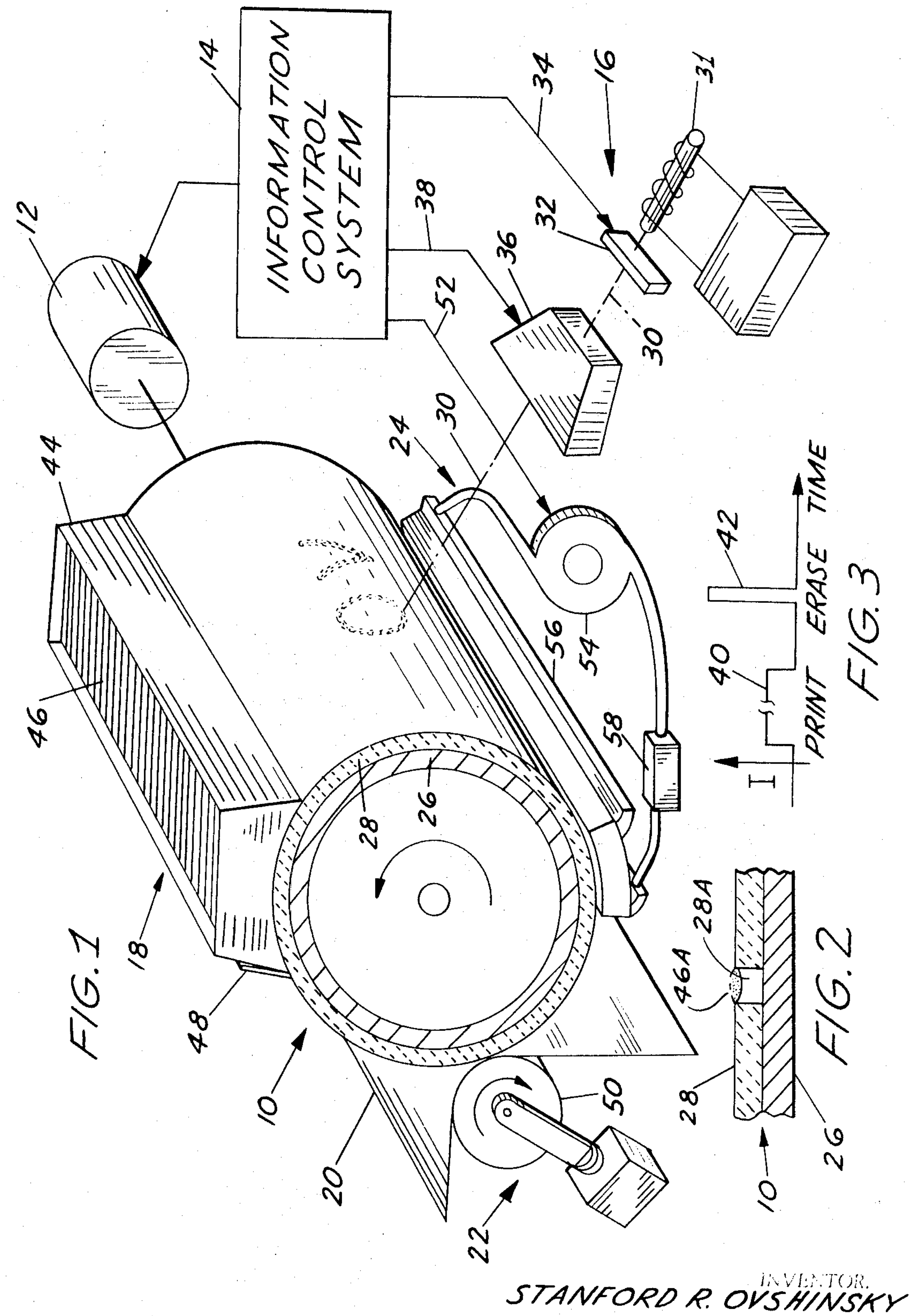
FIG. 1 is a diagram illustrating one embodiment of a printer operating in accordance with the intaglio method of printing.
FIG. 2 is an enlarged partial view of the printing plate in FIG. 1 employing a glassy material initially in the amorphous or disordered state.
FIG. 3 is a diagram illustrating the waveforms for pulses produced by the laser in FIG. 1.

The printing system of FIG. 1 employs a drum type printing plate 10 which is rotated by a motor 12. An information control system 14 controls the speed of motor 12 and also the operation of a scanning laser system 16. An inking station 18 applies ink to the printing plate 10 as it rotates, and the ink is transferred to a document 20 at a printing station 22. The ink is removed at a cleaning station 24 prior to erasing or reimaging by the laser system 16.

The printing plate 10 is composed of a structural support 26 having a glassy material 28 bonded to the outer periphery thereof. The material 28 may be composed of $Se_{92}Te_6Tl_2$ ;$Se_{92}Te_6a_1S_1$; or other materials, such as those described in U.S. Pat. No. 3,271,591, which can be switched from an amorphous or disordered state into a crystalline or more ordered state. FIG. 2 illustrates a partial enlarged view of the printing plate 10. Like numbers are used throughout the drawings to designate similar elements. The glassy material 28 is initially in the amorphous or disordered state occupying a relatively large volume. Another area 28A illustrates the cross section of the glassy material 28 after being switched into its crystalline or more ordered state. In the crystalline state the density of the material is higher and the area of the material 28A occupies less volume. In FIG. 2 the result of this change in volume is illustrated as a depression in the surface of material 28.

The transformation of the material 28 from the amorphous to the crystalline state is accomplished by a laser beam 30 which is directed onto the surface of printing plate 10 by laser system 16. The laser beam 30 originates at a source 31 which may be for example, a CW YAG laser capable of deliverying 1 watt at a wavelength of 1.06 micron. The beam 30 is modulated into a series of pulses by an optical shutter 32 in response to signals on a line 34 from information control system 14. The direction of the beam 30 is controlled by a scanner 36 in response to signals on a line 38 from information control system 14. In operation a raster scan is formed on the surface of printing plate 10 as a result of the horizontal motion of the beam 30 produced by scanner 36, and the rotational movement of the plate 10 produced by motor 12. More details concerning the operation of motor 12 and laser system 16 may be found in copending U.S. application Ser. No. 828,859 filed May 29, 1969, entitled "HIGH SPEED PRINTER OF MULTIPLE COPIES FOR COMPUTER OUTPUT INFORMATION" by Stanford R. Ovshinsky, Ronald G. Neale and Edgar J. Evans.

FIG. 3 is a graph illustrating waveforms for pulses produced by scanning laser system 16. Intensity (I) is plotted along the ordinate, and time is plotted along the abscissa. A pulse 40 of relatively low intensity but long duration causes the initially amorphous material 28 to switch to the crystalline or more ordered state in an area 28A illustrated in FIG. 2. The switching occurs as a result of Joule heating followed by a cooling period during which crystallization occurs thereby reducing the volume of the material 28. Another pulse 42 is illustrated in FIG. 3 to have a higher intensity, but much shorter duration. Pulse 42 switches material 28 from the crystalline or more ordered state to the amorphous state. While the intensity of the laser beam 30 and pulse length of pulses 40 and 42 varies in accordance with the type and thickness of material 28, a typical example of the materials, thickness and energy required for operation pursuant to the present invention are: composition of material $Se_{92}Te_{7.9}Tl_{.1}$;100 microns thick; 20 nano joule/micron$^3$; a pulse length of 1 milli second for crystallization; and a pulse length of 1 micro second for switching to the amorphous state. In operation pulse 40 produces a depression for printing, and pulse 42 erases the depression.

Referring to FIG. 1, after the desired image is written on the material 28 by scanning laser system 16 thereby forming depressions on the surface of material 28 such as that illustrated at area 28A in FIG. 2, plate 10 is rotated to inking station 18 which includes a reservoir 44 containing ink 46. As material 28 rotates beneath reservoir 44, ink 46 floods the entire surface. A doctor blade 48 wipes the surface of the material 28 clean, except where it is depressed, such as area 28A. The ink remaining in the depression is designated 46A in FIG. 2. The inked surface of material 28 is rotated to printing station 22 where it is brought into contact with document 20 by an adjustable pressure roller 50. Ink is transferred to the document 20 and an image is formed thereon corresponding to the pattern of energy applied to material 28 by scanning laser system 16.

If multiple copies are to be run, printing plate 10 is rotated without operation of either the cleaning station 24 or laser system 16. Inking station 18 refills the depressed discontinuities in the surface of material 28 replenishing the ink which was transferred to the document 20 during the previous printing operation. A large number of copies can be run in this manner without reusing the scanning laser system 11.

When it is desired to change the image written on printing plate 10, cleaning station 24 may be activated by a signal on a line 52 from information control system 14. Line 52 is connected to a gas circulating pump 54 having its high pressure side connected to one end of a chamber 56 and its low pressure side connected to the other end of chamber 56 through a filter 58. Gas is blown onto the surface of the material 28 within the chamber 56, and any ink remaining in the depressed regions such as 28A is carried away. The gas may be air mixed with a mist of alcohol and water. Filter 58 traps the ink before it is returned to pump 54.

After passing through cleaning station 24 a new image is applied to the surface of material 28 by laser system 16. This may be accomplished by applying erase pulses 42 to each area 28A which is in the crystalline or more ordered state, and by applying print pulses 40 to all regions of the material 28 which are to be placed in the crystalline or more ordered state. Alternatively, erase pulses 42 may be applied to all areas that are desired to be in the amorphous state, whether or not the area was previously in the crystalline or amorphous state, and print pulses 40 may be applied to those areas that are desired to be in the crystalline state, whether or not the areas were previously in the amorphous or crystalline state. After the new image is written by laser system 16, printing plate 10 is rotated carrying the image through inking station 18 and printing station 22 where the image is printed on document 20 in a manner similar to that described above.

Varying shades of gray can be printed by varying the depth and/or breadth of the depressions made in the surface of material 28. This may be accomplished by increasing the intensity or length of print pulse 40, thereby switching material 28 further into the crystalline or more ordered state and also widening the area switched. In this manner the depressed area 28A may be made both deeper and wider than that illustrated in FIG. 2. Another method of accomplishing this is to widen laser beam 30 by defocusing. It may also be necessary to increase the energy level of source 31. By varying the depth and breadth of the depressions, the amount of ink soaked up into fibers of the document 20 can be made to vary at any point thereby producing shades of gray in accordance with the intaglio method of printing.

Figures 4, 5, 6:
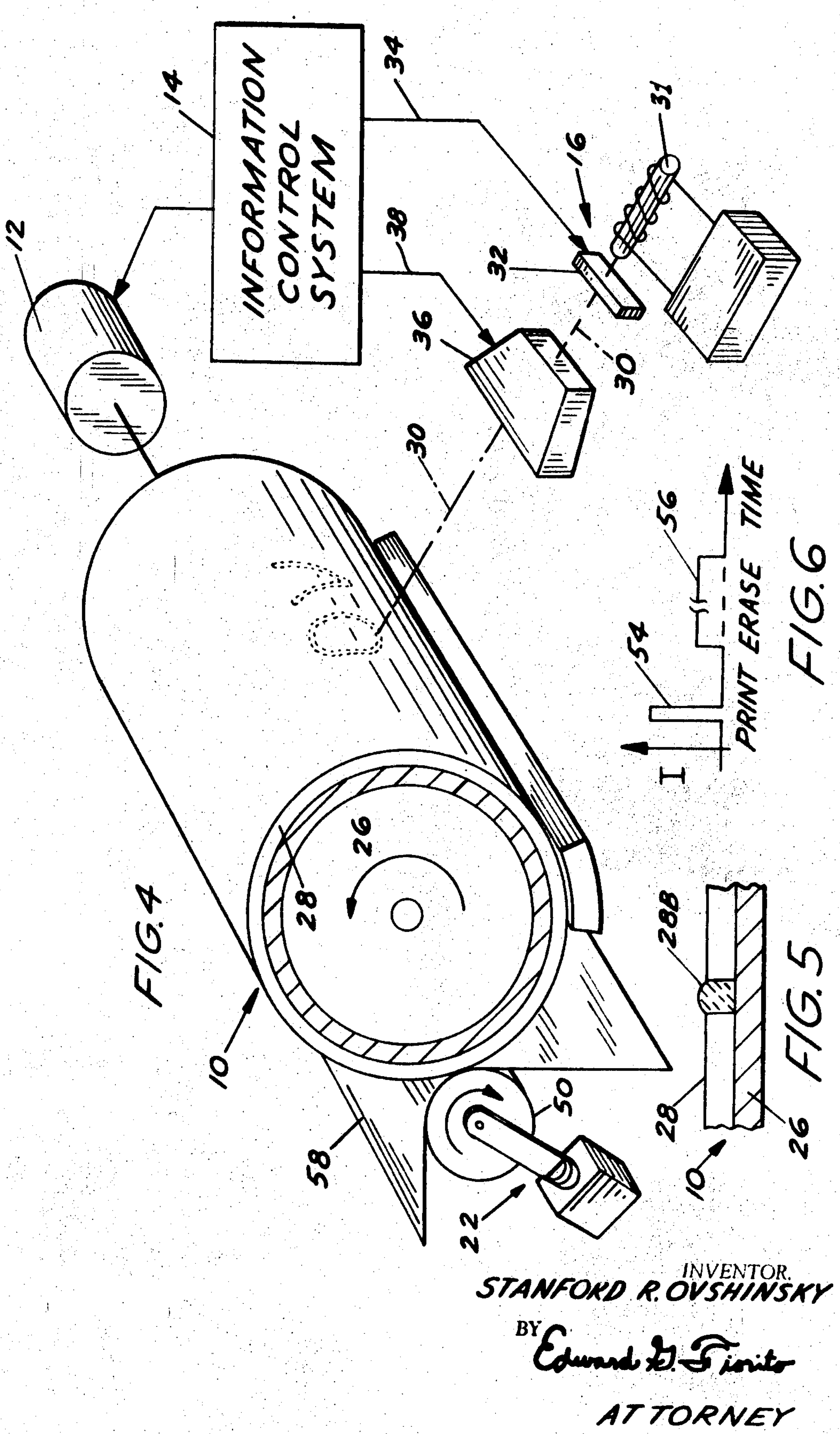
FIG. 4 is a diagram illustrating a printer operating in accordance with the relief method of printing.
FIG. 5 is an enlarged partial view of the printing plate in FIG. 1 employing a glassy material initially in the crystalline or more ordered state.
FIG. 6 is a diagram illustrating the waveforms for pulses produced by the laser in FIG. 4.

In FIG. 4 another form of the present invention is illustrated wherein the relief method of printing is performed. This system is similar to the printer shown in FIG. 1, except that no inking station 18 or cleaning station 24 are employed in the system of FIG. 4. As illustrated in FIG. 5 the glassy material 28 is initially in its crystalline or more ordered state occupying a relatively small volume. Upon application of a laser beam 30 at a region 28B, the material 28 switches to the amorphous or disordered state thereby expanding its volume and forming a raised discontinuity in the surface of material 28. FIG. 6 illustrates the waveform of laser pulses produced by scanning laser system 16 in FIG. 4. A print pulse 54 is similar in shape to erase pulse 52 in FIG. 3. This high intensity, short duration print pulse 54 switches the material 28 into the amorphous or generally disordered state producing the raised discontinuity at area 28B illustrated in FIG. 5. An erase pulse 56 is similar in intensity and duration to the print pulse 40 in FIG. 3. The erase pulse 56 switches material 28 to the crystalline or more ordered state thereby erasing the raised discontinuity at area 28B in FIG. 5.

After the image represented by the raised discontinuities on the surface of material 28 is formed by scanning laser system 16 in FIG. 4, printing plate 10 is rotated by motor 12 so that the image is brought into contact with a pressure sensitive document 58. The document 58 may include a sheet of carbon paper placed on top of a sheet of common bond paper. When the raised discontinuities in the surface of material 28 are pressed into the document 58 by pressure roller 50 the carbon is transferred from the carbon paper to the bond paper of document 58. Alternatively, document 58 may be composed of one of a number of different commercial recording media known as carbonless paper. This paper turns color upon the application of pressure without the use of an additional sheet of carbon paper.

Shades of gray can be printed using the system of FIG. 4 by varying the intensity and/or duration of print pulse 54. This causes the raised discontinuities illustrated at area 28B in FIG. 5 to vary in height and breadth. Accordingly, the higher and wider raised discontinuities apply a greater pressure over a larger area of the document 58 producing a darker and wider spot. Lighter shades of gray are produced by raised discontinuities of smaller height and breadth.

Whether the image written on the surface of material 28 is in the form of depressed discontinuities or raised discontinuities the image is normally humanly visible as illustrated by the letters OV in FIGS. 1 and 4. This feature of the present invention allows the information written on the drum to be visually observed (although it is a mirror image of the printed image on the document 20) so that corrections can be made prior to running off copies. Alternatively, a single proof can be printed and read for accuracy. Corrections may be made by scanning laser system 16 on a selective basis.

It is also possible to have a plurality of laser scanning systems 16 operating in parallel and writing on printing plate 10 at the same time. Where a large source of electromagnetic radiation is employed, an entire image may be placed on the printing plate 10 at the same time by illuminating material 28 through a transparency of the image, or by reflecting the energy from a surface containing the image.

Another modification to the present invention can be made by replacing the reservoir 44 in FIG. 1 with a soft roller impregnated with ink to flood the surface of material 28 with ink. An ink roller may also be employed in the system in FIG. 4 for applying ink to the peaks of the raised discontinuities illustrated by region 28B in FIG. 5. In this modification a hard ink roller would be preferred since a separation between the surface of printing plate 10 and the ink roller must be maintained so that ink is not applied to those regions of the plate 10 where the material 28 is in the crystalline or more ordered state. Tolerances may be relaxed where there is a sufficiently large number of raised discontinuities written onto the material 28 so that a hard ink roller would constantly engage a large number of raised discontinuities thereby riding on the peaks instead of making contact with the lower regions of the material 28. The inked peaks may then be brought into contact with normal bond paper and the image printed thereon in accordance with the letterpress method or printing.

Erasure may also be accomplished in the system of FIG. 4 by applying energy from a quartz heat lamp, RF generator or any other source of energy capable of switching the material 28 from the amorphous or generally disordered state to the crystalline or more ordered state.

The cleaning station 24 in FIG. 1 may be eliminated in those cases where erasing can be accomplished by passing the laser beam 30 through ink such as 46A in FIG. 2. A higher intensity level may be required for laser source 31 since some of the laser energy would be absorbed by ink 46A. However, if a large portion of the ink 46A is transferred to the paper 20, the ink remaining in the depression may be insufficient to inhibit erasure of the depression even when the laser beam 20 is operated at normal intensity levels.

Another manner of utilizing the present invention in the relief method of printing can be accomplished by initially placing the material 28 in the amorphous or generally disordered state and switching it to the crystalline or more ordered state at all regions where printing is not to take place. In this manner the unswitched portions of the material 28 remain in the relatively larger volume state thereby leaving raised discontinuities in the surface of material 28. A similar reversal can be made in the system of FIG. 1 so that the scanning laser system 16 writes the negative of the image to be printed thereby leaving depressed areas unswitched by the laser beam 30 which may be filled with ink and printed in accordance with the intaglio method of printing.

While the printing plate 10 is shaped in the form of a drum, it may be preferable in other embodiments of the present invention to form the printing plate in other shapes such as a flat rectangular shape, or a flexible belt, and various other forms of inking, printing, and cleaning stations may be employed. Additionally, an electron beam may be employed in the present invention instead of the laser beam 30 illustrated in FIGS. 1 and 2.

Numerous other modifications may be made to various forms of the invention described herein without departing from the spirit and scope of the invention.

I claim:

1. A method of printing comprising:

providing a printing plate having a surface composed of material which is capable of switching between at least two states in response to energy applied thereto, and wherein the material has a different volume in each of said states, which difference in volume is maintained after said application of energy ceases;

selectively applying a pattern of energy to discrete areas of said surface to switch the material in said discrete areas and to form an image of raised discontinuities on said surface;

pressing said printing plate against a recording medium which is responsive to variations in pressure applied thereto, whereby said raised discontinuities create greater pressure upon said recording medium than other portions of said printing plate.

2. A method of printing comprising:

providing a printing plate having a surface composed of material which is capable of switching from a first state to a second state in response to a first energy level applied thereto, said material having a different volume in each of said states, which difference in volume is maintained after said application of said energy of said first energy level ceases and which is capable of returning to said first state in response to a second energy level applied thereto, thereby assuming the volume corresponding to said first state;

selectively applying a pattern of said first energy level to discrete areas of said surface to switch said material to said second state and to form an image of discontinuities on said surface;

inking said surface to cause ink to cling to said discontinuities;

transferring at least a portion of the ink clinging to said discontinuities onto a record; and applying said second energy level to at least part of said discrete areas containing said material in said second state to erase at least part of said image.

3. The method of claim 2 wherein the material of said surface contracts in response to the application of energy of said first level and expands in response to the application of energy of said second level, and said ink enters the voids created by the contraction of said material; and further characterized by the step of removing said ink after transferring ink to said record.

4. A method of printing comprising:

providing a printing plate having a surface composed of material which is capable of switching from a first state to a second state in response to a first energy level applied thereto, said material having an increased volume in said second state, which increased volume is maintained after said application of said energy of said first energy level ceases and which is capable of returning to said first state in response to a second energy level applied thereto, thereby assuming the volume corresponding to said first state;

selectively applying a pattern of said first energy level to discrete areas of said surface to switch said material to said second state and to form an image of raised discontinuities on said surface;

pressing said surface against a recoding medium which responds to variations in pressure applied thereto; and applying said second energy level to at least part of said discrete areas containing said material in said second state to erase at least part of said image.

5. A method of printing comprising:

providing a printing plate having a surface composed of material which is capable of switching between at least two states in response to energy applied thereto, and wherein the material has a different volume in each of said states, which difference in volume is maintained after said application of energy ceases;

selectively applying a pattern of energy to discrete areas of said surface to switch said material and to form an image of discontinuities on said surface;

inking said surface to cause ink to cling to said discontinuities; and transferring at least a portion of the ink clinging to said discontinuities onto a record.

6. The method of claim 5 wherein the material of said surface contracts in response to energy applied thereto, and said ink enters the depressions left thereby.

* * * * *